(12) United States Patent
Krzywon

(10) Patent No.: US 11,958,589 B1
(45) Date of Patent: Apr. 16, 2024

(54) CONTROLLING RATE OF ROTOR FEATHER BY PRIMARY BLADE ANGLE CONTROL SYSTEM

(71) Applicant: Pratt & Whitney Canada Corp., Longueuil (CA)

(72) Inventor: Jagoda Krzywon, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/091,617

(22) Filed: Dec. 30, 2022

(51) Int. Cl.
*B64C 11/38* (2006.01)
*B64C 11/40* (2006.01)

(52) U.S. Cl.
CPC ............ *B64C 11/385* (2013.01); *B64C 11/40* (2013.01)

(58) Field of Classification Search
CPC ....... B64C 11/385; B64C 11/38; B64C 11/40; B64C 11/42; B64C 27/64; F03D 7/0224
See application file for complete search history.

(56) References Cited

U.S. PATENT DOCUMENTS

| | | | | |
|---|---|---|---|---|
| 2,840,171 A | * | 6/1958 | Jedrziewski | B64C 11/385 416/47 |
| 4,462,753 A | * | 7/1984 | Harner | F03D 7/0224 416/49 |
| 5,037,271 A | * | 8/1991 | Duchesneau | B64C 11/38 416/157 R |
| 5,174,718 A | * | 12/1992 | Lampeter | B64C 11/38 416/157 R |
| 2010/0014972 A1 | * | 1/2010 | Steffensen | F03D 7/0264 416/31 |
| 2017/0361919 A1 | | 12/2017 | Waddleton | |
| 2019/0031319 A1 | | 1/2019 | Calkins et al. | |
| 2020/0255123 A1 | * | 8/2020 | Futa, Jr. | B64C 11/44 |
| 2020/0298959 A1 | | 9/2020 | Castellani et al. | |
| 2021/0079855 A1 | | 3/2021 | Cervelli et al. | |
| 2021/0164403 A1 | * | 6/2021 | Krzywon | B64C 11/38 |
| 2022/0266982 A1 | * | 8/2022 | Marger | B64C 11/385 |

* cited by examiner

*Primary Examiner* — Christopher Verdier
*Assistant Examiner* — Michael K. Reitz
(74) *Attorney, Agent, or Firm* — NORTON ROSE FULBRIGHT CANADA LLP

(57) ABSTRACT

A rotor blade control system includes a main control valve having an inlet for receiving liquid and an outlet for issuing liquid to a rotor pitch change actuator. The main control valve is configured to control flow of liquid from the inlet to the outlet to modify pitch angle of rotor blades. A feathering system has a first conduit in fluid communication with the outlet of the main control valve, a second conduit in fluid communication with the rotor pitch change actuator, and a drain conduit in fluid communication with a liquid return system. The feathering system has a normal operation mode for supplying liquid from the main control valve to the rotor pitch change actuator, and a feathering mode for allowing drainage from the rotor pitch change actuator to the drain conduit across a range of flow rates.

9 Claims, 3 Drawing Sheets

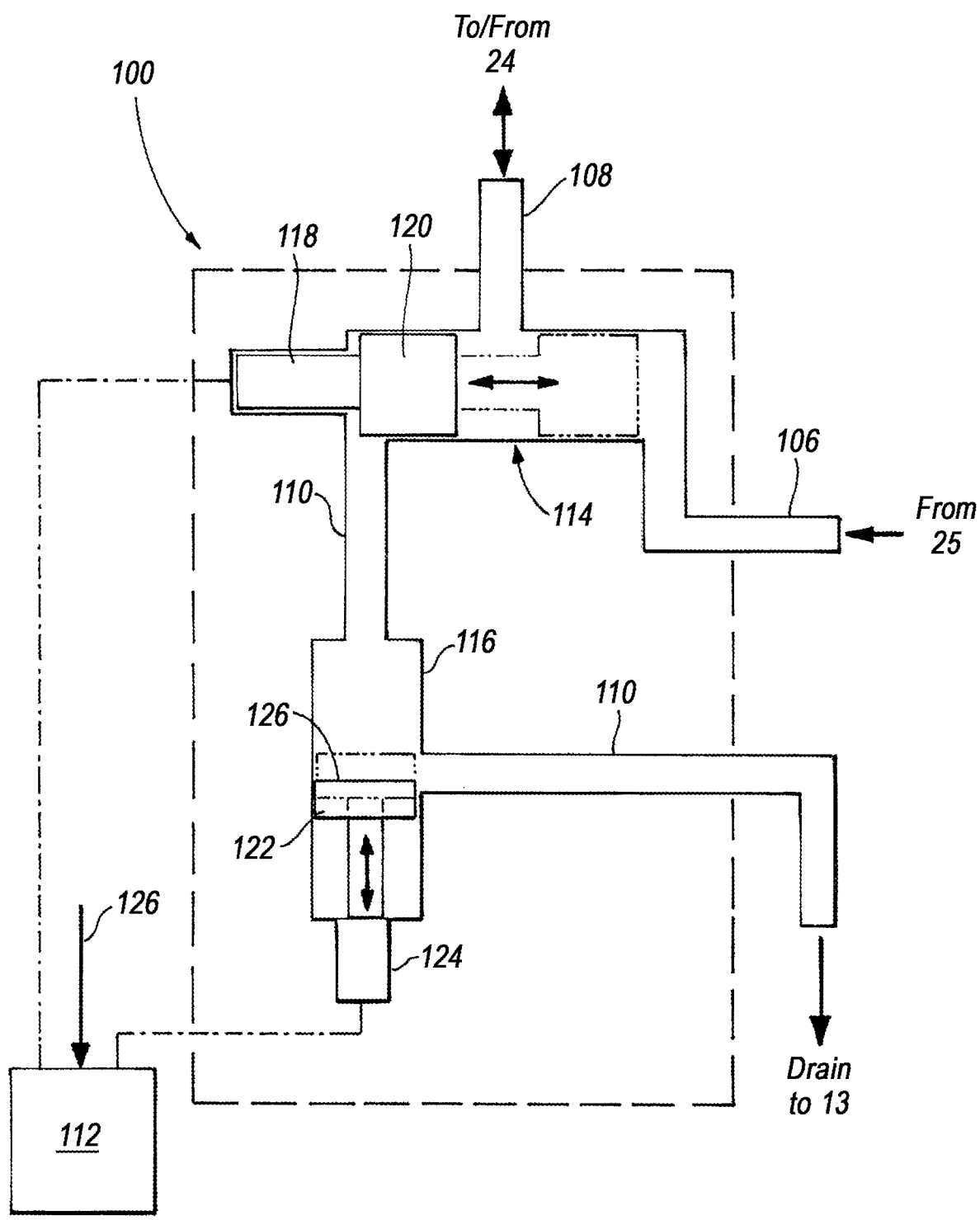

CONTROLLING RATE OF ROTOR FEATHER BY PRIMARY BLADE ANGLE CONTROL SYSTEM

BACKGROUND

1. Field

The present disclosure relates to controlling air movers, and more particularly to controlling blade angles in rotors such as propellers.

2. Description of Related Art

Propeller-driven aircraft often incorporate a protection feature that commands the propeller into the feather position to preclude an unsafe event such as uncontrolled propeller acceleration or inadvertent propeller transition into an undesired range of blade angles. Activation of the protective propeller feather function is usually performed abruptly in reaction to the detected unsafe conditions to quickly prevent continuing to operate in a state that may result in an imminent hazardous or catastrophic flight safety event.

However, for a hydraulically-actuated propeller, sudden maximum drainage via a feather valve may introduce a sudden change to the acting forces on an airplane and affect its controllability if the propeller quickly transitions from a state of high thrust and low aircraft rolling momentum to a state of zero thrust and significant aircraft rolling momentum, in addition to significant loads to engine and aircraft structures. Following confirmation that the unsafe state was prevented but prior to completely feathering the propeller, maximum drainage flow may not always be necessary.

The conventional techniques have been considered satisfactory for their intended purpose. However, there is an ever present need for improved systems and methods for controlling protective propeller feather functions. This disclosure provides a solution for this need.

SUMMARY

A rotor blade control system includes a main control valve having an inlet for receiving liquid and an outlet for issuing liquid to a rotor pitch change actuator. The main control valve is configured to control flow of liquid from the inlet to the outlet to modify pitch angle of rotor blades. A feathering system has a first conduit in fluid communication with the outlet of the main control valve, a second conduit in fluid communication with the rotor pitch change actuator, and a drain conduit in fluid communication with a liquid return system. The feathering system has a normal operation mode for supplying liquid from the main control valve to the rotor pitch change actuator by allowing flow through the feathering system from the first conduit to the second conduit. The feathering system has a feathering mode for allowing drainage from the rotor pitch change actuator to the drain conduit by connecting the second conduit in fluid communication with the drain conduit, wherein the feathering system is configured to meter flow to the drain conduit across a range of flow rates, ranging from fully open flow from the second conduit to the drain conduit to fully closed flow from the second conduit to the drain conduit.

A pump can be included in fluid communication to provide pressurized liquid to the main control valve. The feathering system can include a selector valve in fluid communication with the first conduit, with the second conduit, and with the drain conduit to selectively place the second conduit in fluid communication with the first conduit or with the drain conduit. The feathering system can include an actively controlled metering valve in the drain conduit, configured to open, moderate, and close flow through the drain conduit under active control in the feathering mode. The feathering system can include a passively controlled metering valve in the drain conduit, configured to passively meter flow in through the drain conduit in the feathering mode.

A controller can be operatively connected to control the feathering system in the feathering mode. The controller can include machine readable instructions configured to cause the controller to receive input indicative of a need to feather the rotor pitch angle actuator and command the feathering system to switch to the feathering mode according to methods disclosed herein.

A method of controlling rotor blade angle includes receiving input indicative of a need to feather a rotor pitch angle actuator, commanding a feathering system to switch to a feathering mode to drain the rotor pitch angle actuator to feather a rotor, commanding the feathering system to drain the rotor pitch angle actuator at a fully open drain flow rate initially, and receiving input indicative of exiting the need to feather. The method includes after receiving the input indicative of exiting the need to feather, commanding the feathering system to modulate drainage from the rotor pitch angle actuator somewhere in a range between the fully open flow rate and fully closing off flow draining the rotor pitch angle actuator.

Modulating drainage can include gradually reducing rate of oil drain from the second conduit to the drain conduit. Gradually reducing rate of oil drain can be performed under active control or under passive control. Modulating drainage can include after gradually reducing rate of oil drain, fully closing off flow draining the rotor pitch angle actuator.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain Figures, wherein:

FIG. 4 is a schematic view of the feathering system of FIG. 3.

DETAILED DESCRIPTION OF THE PREFERRED EMBODIMENTS

Figure 1:
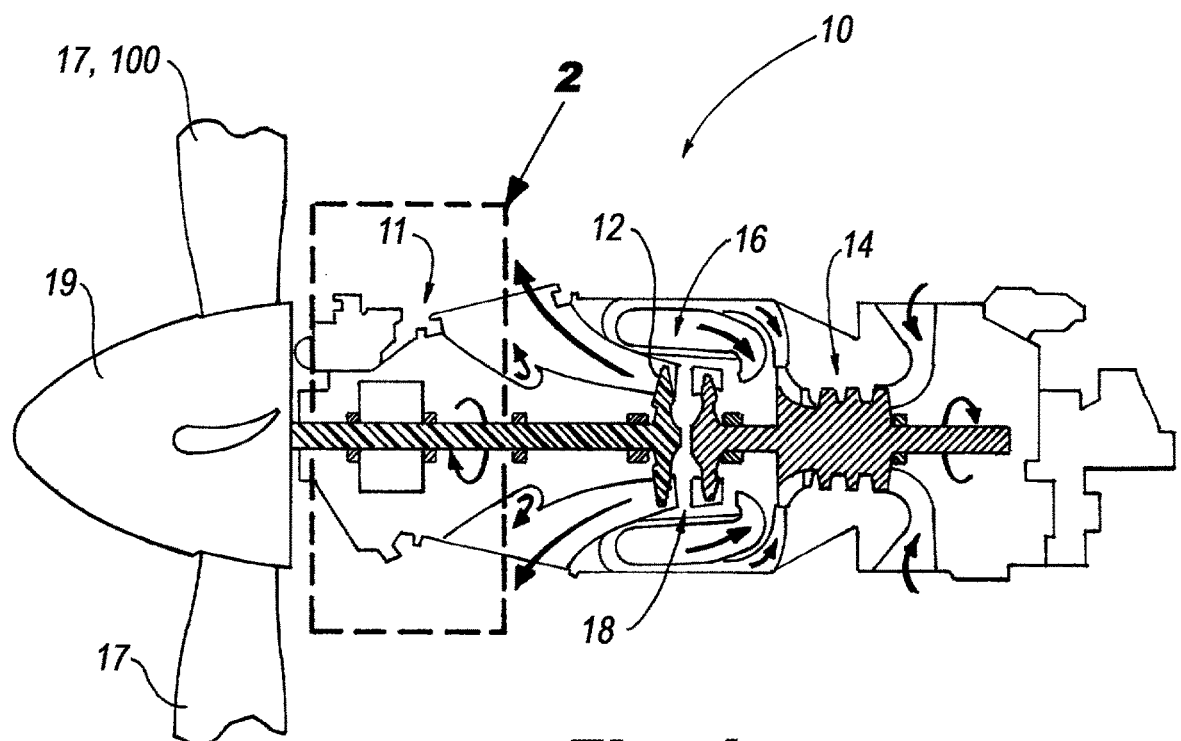
FIG. 1 is a schematic cross-sectional view of a gas turbine engine.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-4, as will be described. The systems and methods described herein can be used to control the rate of drainage from a feathering system after a rotor, such as a propeller, feathering event to avoid over correcting.

FIG. 1 illustrates a gas turbine engine 10 of a type for use in subsonic flight, generally comprising in serial flow communication a compressor section 14 for pressurizing ambient air, a combustor 16 in which the compressed air is mixed with fuel and ignited for generating an annular stream of hot combustion gases, and a turbine section 18 for extracting energy from the combustion gases. A low pressure (LP) turbine 12 drives, via a reduction gear box (RGB), a propeller 19 having propeller blades 17 for providing thrust to the aircraft. An oil system 11 is provided for the gas turbine engine 10, and provides lubrication for the rotating components of the gas turbine engine 10, which include bearings for the rotating turbomachinery (e.g. the compressors, turbines, shafts, and gears), the RGB and the propeller control systems, etc.

Figure 2:
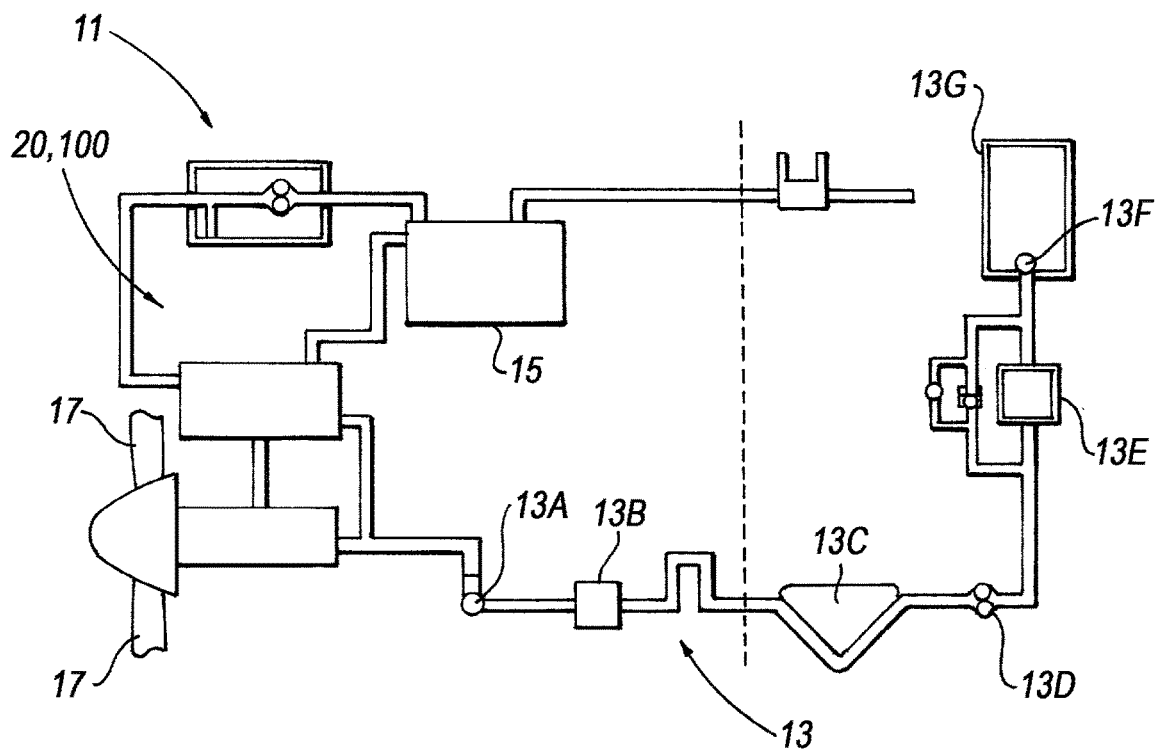
FIG. 2 is a schematic view of an oil system for the gas turbine engine of FIG. 1, the oil system having a rotor blade angle control system.

Referring to FIG. 2, the oil system 11 can include any number of components, and any arrangement of components, to provide lubrication to the gas turbine engine 10 of FIG. 1. One such component, an engine oil return system 13, is shown in the depicted embodiment. The engine oil return system 13 receives used or scavenged oil from the lubricated components of the gas turbine engine, filters and cools the reclaimed oil, and pressurizes it for recirculation to the rotating turbomachinery. In the depicted embodiment, the engine oil return system 13 includes a chip detector 13A to detect the presence of unacceptably-large debris in the oil returning from the propeller 19. The oil and any debris is then filtered with a screen 13B, and then subjected to anti-icing procedures at an anti-icing station 13C. A scavenge pump 13D pressurizes the oil and sends it through another filter 13E before passing through another chip detector 13F before being collected in a main oil tank 13G. From the main oil tank 13G, the oil can be pumped with a supply pump to any number of different components of the oil system 11. For example, oil can be pumped from the supply pump to an auxiliary oil tank 15. The engine oil return system 13 can have more, fewer, and/or different components than those schematically depicted or described above.

In the depicted embodiment, the auxiliary oil tank 15 serves as a source of oil for a propeller blade angle control circuit 20. The oil supplied to the propeller blade angle control circuit 20 (or "control circuit 20") provides hydraulic power to the propeller control circuit 20, allowing it to control the pitch of the variable-pitch propeller blades 17. The control circuit 20 is thus integrated with, and supplied by, the oil system 11. By being integrated with the oil system 11 of the gas turbine engine, the control circuit 20 is able to use the oil provided by oil system 11 to control the pitch of the propeller blades 17. The oil of the oil system 11 therefore provides a lubricating function, and an actuating function by providing hydraulic power.

Figure 3:
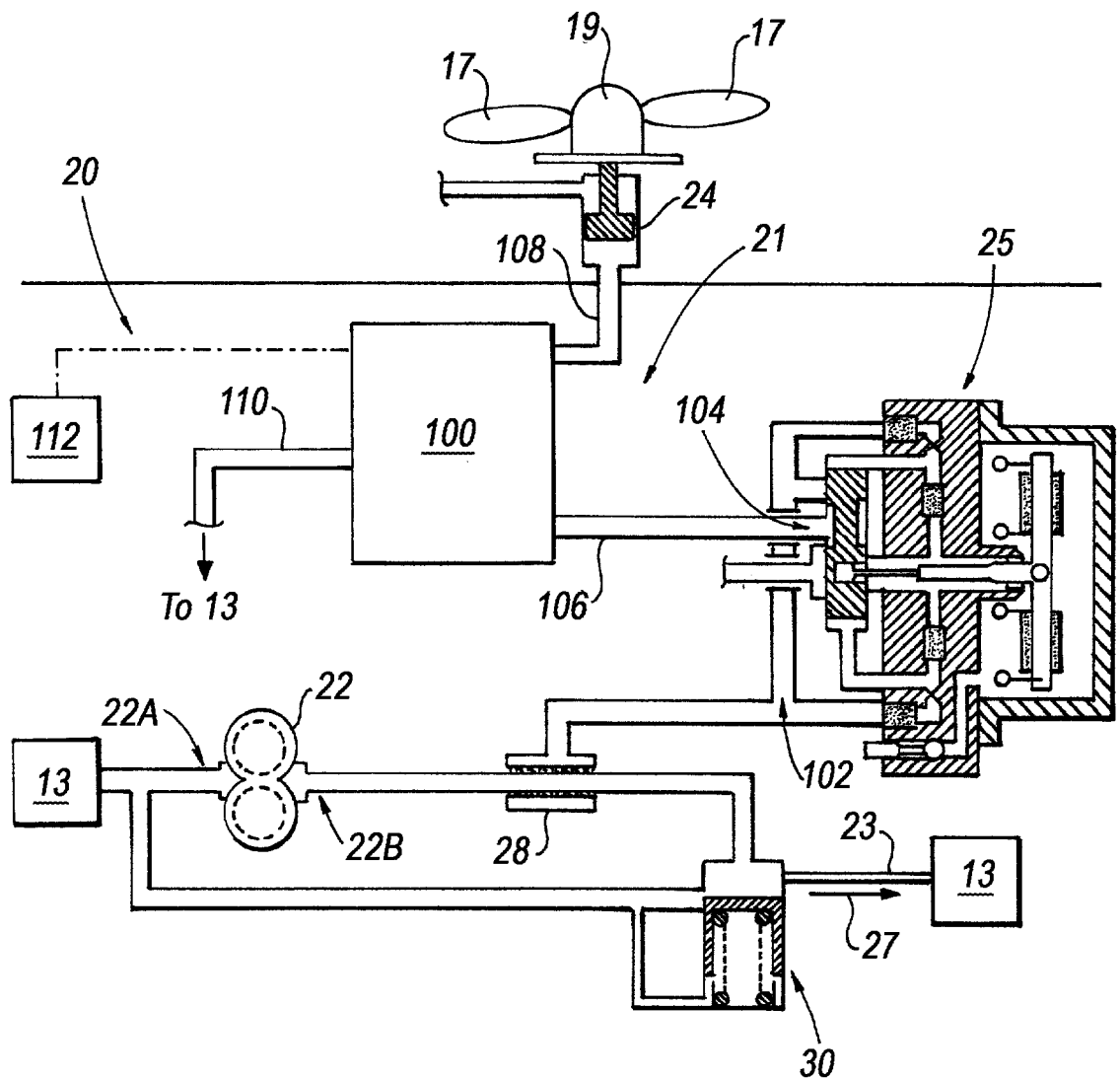
FIG. 3 is a schematic view of the rotor blade angle control system of FIG. 2, showing the feathering system.

The control circuit 20 is an assembly of fluid lines, connectors, valves, and other components that supply oil to the mechanisms that change the pitch of the propeller blades 17. In the embodiment of FIG. 3, the control circuit 20 has a propeller control unit 21 to effect changes in the pitch of the propeller blades 17, a fixed-displacement pump 22 which provides oil to the propeller control unit 21, an oil cooling conduit 23 which helps to divert excess oil to the engine oil return system 13, and a flow regulator 30 which modulates to the flow of oil.

The propeller control unit 21 modulates the supply of oil that is used to modify the angle of the propeller blades 17. It can thus have any suitable component, and any suitable arrangement of components, to achieve this functionality. More particularly, the propeller control unit 21 may include different actuators, valves, and other components to adjust the angle of the propeller blades 17. In the depicted embodiment, the propeller control unit 21 has a propeller pitch change actuator 24 which can effect fine and coarse changes in propeller blade 17 pitch. The propeller control unit 21 also has a servo valve 25 which controls the pressure of the oil supplied to the pitch change actuator 24. The propeller control unit 21 also has a feathering system 100 supplied with oil by the servo valve 25. The propeller control unit 21 can have more, fewer, and/or different components than those depicted or described above.

The fixed-displacement pump 22 outputs a substantially constant flow rate of oil to the propeller control unit 21. The pump 22 is therefore located within the control circuit 20 upstream of the propeller control unit 21, and acts as a dedicated source of constant hydraulic power. It is typically sized to provide sufficient hydraulic power to satisfy the largest loads of the propeller control unit 21. The pump 22 is supplied with oil from a component of the oil system 11, such as from the engine oil return system 13.

Still referring to FIG. 3, the oil cooling conduit 23 is a return conduit which sends excess oil from the pump 22 to the engine oil return system 13. The oil cooling conduit 23 can therefore be any hose, tube, pipe, or other similar conduit that extends from an outlet 22B of the pump 22 to the engine oil return system 13. It will be appreciated that the oil cooling conduit 23 may be physically spaced from the outlet 22B of the pump 22 provided that it is fluid communication therewith to receive oil therefrom.

In allowing excess oil to be diverted away from the pump 22 and propeller control unit 21, the oil cooling conduit 23 defines a leakage path 27 that leads to the engine oil return system 13. "Excess" oil is oil that is supplied by the fixed-displacement pump 22 but that is not required by the propeller control unit 21. Excess oil is typically available during steady-state operation of the propeller 19 (e.g. flight idle, ground idle, etc.), when there is no need to change the pitch of the propeller blades 17. Rather than returning this relatively hot excess oil to an inlet 22A of the pump 22, as is done in some conventional blade angle control systems, the oil cooling conduit 23 allows the excess oil to be diverted, directly or indirectly, to the engine oil return system 13 where it can be cooled using any of the techniques used to cool the oil being returned from other parts of the oil system 11 (e.g. air-oil heat exchanger, fuel-oil heat exchanger, circulation, etc.). The oil cooling conduit 23 therefore helps to divert relative hot oil away from the pump 22, thereby reducing the likelihood of damage to the pump 22 caused by overheating. For example, it is known that relative hot oil (i.e. in excess of 275° F.) may exceed the temperature limits of some of the elastomers used in seals for the pump 22, or of the coils in valves of the pump 22. Those skilled in the art will readily appreciate that not every propeller control unit (PCU) design requires oil cooling, and that oil cooling can be omitted if suitable for a given application without departing from the scope of this disclosure.

Still referring to FIG. 3, the flow regulator 30 governs the amount of oil that is leaked along the leakage path 27 to the engine oil return system 13. The flow regulator 30 is located between the pump 22 and the propeller control unit 21. In the depicted embodiment, the flow regulator 30 is shown downstream of the pump 22, downstream of a wash screen 28, and upstream of the servo valve 25 of the propeller control unit 21. Other configurations are possible. The flow regulator 30 is fluidly connected to the oil cooling conduit 23, and is operable between an open position and a closed position to selectively allow access to or block, respectively, the leakage path 27 defined by the oil cooling conduit 23 that leads to the engine oil return system 13. It is to be noted that the oil cooling conduit 23 even though is considered herein as providing a path for oil return for oil cooling purpose, on certain applications may be used for other purposes, e.g., for the valve 30 to be able to drain the excessive oil from the PCU over the optimal for the PCU EHSV operation, therefore allows the PRV to maintain optimal oil flow at the inlet to the PCU EHSV.

In the open position, the flow regulator 30 allows access to the leakage path 27 and directs oil through the oil cooling conduit 23 and along the leakage path 27 toward the engine oil return system 13 so that the oil can be cooled. In this position, where oil is diverted along the leakage path 27, the flow regulator 30 is regulating the pressure of the oil supplied to the propeller control unit 21 and diverting excess oil toward the engine oil return system 13. The flow regulator 30 will typically, but not exclusively, operate in the open position during steady-state operation of the propeller 19. During steady-state operation, there is less of a demand from the pitch change actuator 24 responsible for changing the angle of the propeller blades 17. Therefore, "steady-state" refers to relatively little or no demand for hydraulic power from the downstream propeller control unit 21. A cooling oil flow diversion can thus be provided by the flow regulator 30 during steady-state operation.

In the closed position, the flow regulator 30 blocks access to the leakage path 27. Oil is thus instead directed entirely toward the propeller control unit 21 to effect changes in the angle of the propeller blades 17. In this position, where oil is prevented from being diverted along the leakage path 27, substantially all of the hydraulic power supplied by the pump 22 is available for the propeller control unit 21 to make the required changes in propeller blade 17 pitch. This is in contrast to some conventional blade angle control systems, which allow leaking flow back to the engine oil return even during high load maneuvers. The flow regulator 30 will typically, but not exclusively, operate in the closed position during transient operation of the propeller 19. During transient operation, there is a relatively high demand for hydraulic power. Some examples of transient flow regimes include accommodating for large changes in engine power, moving the engine into or out of reverse, or feathering or unfeathering the propeller 19. Therefore, "transient" refers to relatively high demand for hydraulic power from the downstream propeller control unit 21.

The main control valve, i.e. servo valve 25 has an inlet 102 for receiving liquid, e.g. from just downstream of a wash screen 28, and an outlet 104 for issuing liquid to the propeller pitch change actuator 24. The propeller control circuit or unit 20 is configured to control flow of liquid from the inlet 102 to the outlet 104 to modify pitch angle of propeller blades 17. The feathering system 100 has a first conduit 106 in fluid communication with the outlet 104 of the main control valve 25, a second conduit 108 for fluid communication with the propeller pitch change actuator 24, and a drain conduit 110 that drains liquid to the engine oil return system 13. The feathering system 100 has a normal operation mode for supplying liquid from the main control valve 25 to the propeller pitch change actuator 24 by allowing flow through the feathering system 100 from the first conduit 106 to the second conduit 108. The feathering system 100 has a feathering mode for allowing drainage from the propeller pitch change actuator 24 to the drain conduit 110 by connecting the second conduit 108 in fluid communication with the drain conduit 110, which also disconnects the second conduit 108 from the first conduit 106. The feathering system 100 is configured to meter flow to the drain conduit 110 across a range of flow rates, wherein the range of flow rates ranges from fully open flow from the second conduit 108 to the drain conduit 110, to fully closing off flow from the second conduit 108 to the drain conduit 110. In other words, the feathering system 100 allows for variable drain rates other than just a simple on/off drain scheme. A controller 112 is operatively connected, as indicated in FIG. 3, to control the feathering system 100.

The feathering system 100 includes a selector valve 114 in fluid communication with the first conduit 106, with the second conduit 108, and with the drain conduit 110 to selectively place the second conduit 108 in fluid communication with either the first conduit 106 or with the drain conduit 110. The feathering system 100 includes an actively controlled metering valve 116 in the drain conduit 110. The metering valve is configured to open, moderate, and close flow through the drain conduit 110 under active control in the feathering mode.

The controller 112 is operatively connected to control the feathering system 100 in the feathering mode, and to switch between the feathering mode and the normal operation mode. The controller 112 can also be connected to control the main valve 25 of FIG. 1 to control propeller blade pitch angle during the normal mode of operation. The controller 112 is operatively connected to the actuator 118 of the selector valve 114 for controlling the switching between normal and feathering modes by commanding the actuator 118 to actuate movement of the piston 120 of the selector valve 114. The position of the piston 120 controls whether the selector valve 114 connects the second conduit 108 to the first conduit 106 for normal operation in the piston position shown in solid lines in FIG. 4, or connects the second conduit 108 to the drain conduit 110 with the piston 120 in the position indicated by the dashed lines in the piston 114. Similarly, the position of the piston 122 of the metering valve 116 determines how much of the flow path of the drain conduit 110 passing through the metering valve 116 is occluded. The actuator 124 of the metering valve 116 actuates movement of the piston 122 based on control signals from the controller 112 to which the actuator 124 is operatively connected. The piston 122 can fully block the drain conduit 110, can fully open the drain conduit 110, or can partially open the drain conduit 110, e.g. to any piston position between fully closed and fully open.

The upper dashed line in the metering valve 116, as oriented in FIG. 4 is indicative of the fully closed position of the piston 122, wherein if the surface 126 of the piston 122 moves to or above the upper dashed line as oriented in FIG. 4, it will fully stop drainage through the drain conduit 110, and the lower dashed line in the metering valve 116, as oriented in FIG. 4, is indicative of the fully open position of the piston 122, i.e. when the piston 122 moves fully to or below this lower line, the drain conduit 110 can drain at its full, unmetered flow rate. For positions of the surface 126 of the piston that are between the two dashed lines of the piston 116 in FIG. 4, partial flow through the drain conduit 110 is achieved. With fine enough control of the position of the piston 122, the rate of flow through the drain conduit 110 can be varied over the range between fully shut off, and fully on. While shown and described herein with active control for the feathering system 100, those skilled in the art will readily appreciate that passive control for the feathering system is also possible without departing from the scope of this disclosure. Also, those skilled in the art will readily appreciate that while the selector valve 114 and the metering valve 116 are shown and described for controlling the feathering mode, any suitable valves or hydraulic or mechanical devices can be used. For instance, the metering valve 116 could be omitted if there is fine enough control of the piston 120 to vary the drainage rate through the selector valve 114 into the drain conduit 110 in the feathering mode. Moreover, the actuators 118 and 124 can be of any suitable type of actuator such as fully hydraulic, fully mechanical, electrical, or combinations of these such as electro-hydraulic servo valves (EHSVs).

The controller 112 includes machine readable instructions configured to cause the controller 112 to receive input 126 indicative of a need to feather the propeller pitch angle actuator 24 and command the feathering system 100 to switch to the feathering mode according to methods disclosed herein.

A method of controlling propeller blade angle includes receiving input 126 indicative of a need to feather a propeller pitch angle actuator, commanding a feathering system 100 to switch to a feathering mode to drain the propeller pitch angle actuator 24 to feather a propeller, e.g. propeller blades 17 of FIGS. 1 and 2. This includes commanding the feathering system 100 to drain the propeller pitch angle actuator 24 at a fully open drain flow rate initially, e.g. with piston 122 of the metering valve 116 in the fully open position allowing full flow rate though the drain conduit 110. The method includes receiving input 126 indicative of exiting the need to feather, e.g. when the conditions requiring feathering have abated. The method includes after receiving the input 126 indicative of exiting the need to feather, commanding the feathering system 100 to modulate drainage from the propeller pitch angle actuator 24 somewhere in a range between the fully open flow rate and fully closing off flow draining the propeller pitch angle actuator 24. This can be accomplished with active control from the controller 112 controlling movement of the piston 122 somewhere between its fully open and fully closed positions in the drain conduit 110, e.g. moving surface 126 of the piston 122 to various positions between the two dashed lines in the metering valve 116 in FIG. 4 as needed to modulate the drainage of the propeller pitch angle actuator 24.

Modulating drainage includes gradually reducing the rate of oil drain from the second conduit 108 to the drain conduit 110. Gradually reducing rate of oil drain is performed under active control with the controller 112, or can be done under passive control, e.g. with springs and/or hydraulic inputs for actuating the pistons 120, 122. If it is the valve 120 that is being modulated, it can allow for maintaining propeller nominal speed and normal operation. If the valve 122 is modulated, it can only minimize the speed of the propeller transition toward feather.

Modulating drainage includes after gradually reducing rate of oil drain, fully closing off flow draining the propeller pitch angle actuator 24. Closing off of the modulated drainage does not allow returning to the normal mode of operation per se, but reduces the rate of propeller transition toward full feather. This is caused by the oil leakage at the propeller dome 19, which still causes the propeller to continue to transition towards feather. Modulating drainage from the second conduit 108 during feather mode allows a slower transition of the propeller blades 17 to fully feathered position, which reduces the spike in torque on the propeller and slows down the reduction of thrust. This can prevent overcorrection when correcting conditions that call for feathering have abated, and can reduce the time needed to return to the normal mode of operation with normal control of propeller blade angles.

This disclosure provides for a protection mechanism to feather the propeller that would modulate oil drainage flow from propeller dome which would reduce and/or minimize the time required to exit the undesired state while afterwards reducing/minimizing undesired thrust and torque fluctuations. For example, the method could first react with the highest required drain capacity (e.g., opening full oil drain from propeller dome), then after the undesired state has been exited, (e.g., propeller blades were brought above the undesired angles, or were brought below a predetermined propeller speed), the protective command can gradually reduce the rate of oil drain from propeller dome, thus allowing a slower transition to full feather which would reduce the spike in torque and slow down the reduction of thrust.

This disclosure provides a protective feathering system that modulates the oil drainage flow rate from the propeller dome, such as via a torque motor or metering valve. By this solution, the feathering valve, e.g. metering valve 116, would be commanded to fully open when an undesired condition is detected, and immediate reaction is required to remove the propeller from operating in the undesired range of speeds or angles (or of any other state considered undesirable). After confirmation that the propeller has been brought out of the undesired state, the oil drainage flow rate would be modulated to a lower rate of drain to allow smooth propeller transition toward a completely feathered propeller. Examples of conditions not requiring protection include propeller speed decreased below a predetermined threshold, propeller blade angle exited the undesired range, or any other as applicable for the aircraft application.

Modulation of the rate of oil drainage would be allowed in the range of the feather valve movement, which still keeps the oil inlet, e.g. conduit 106, from the propeller control unit (e.g., from Electro-Hydraulic Servo-Valve) to the propeller dome closed/blocked.

As an example, a protective feathering feature presented on FIGS. 3-4 could be modulated in a range that blocks the inlet of oil pressure to the propeller dome, which in this configuration, is supplied by an Electro-Hydraulic Servo Vale (EHSV). Downstream from feather valve, the rate of oil drainage from propeller dome would then be modulated from fully open to lower flow rates that still achieve the desired effect (e.g., slow transition of propeller toward full feather, torque reduced below desired level, metric of interest maintained).

The oil modulating protective feathering system can be implemented in any form of a mechanical or hydromechanical or electro-hydro-mechanical valve at any location of the Propeller Control Unit (PCU) that achieves the function of draining the propeller dome. The protection valve may be controlled by an electronic controller capable of opening fast enough to rapidly feather the propeller out of the undesired operating range while being able to modulate flow to reduce the drainage rate when the undesired state has been exited.

The methods and systems of the present disclosure, as described above and shown in the drawings, provide for controlling the rate of drainage from a feathering system after a propeller feathering event to avoid over correcting, and to more quickly return to normal operation after the feathering event. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A rotor blade control system comprising:
a main control valve having an inlet for receiving liquid and an outlet for issuing liquid to a rotor pitch change actuator, wherein the main control valve is configured to control flow of liquid from the inlet to the outlet to modify pitch angle of rotor blades;
a feathering system with a first conduit in fluid communication with the outlet of the main control valve, a second conduit in fluid communication with the rotor pitch change actuator, and a drain conduit in fluid communication with a liquid return system,
wherein the feathering system has a normal operation mode for supplying liquid from the main control valve to the rotor pitch change actuator by allowing flow through the feathering system from the first conduit to the second conduit, and
wherein the feathering system has a feathering mode for allowing drainage from the rotor pitch change actuator to the drain conduit by connecting the second conduit in fluid communication with the drain conduit, wherein the feathering system is configured to meter flow to the drain conduit across a range of flow rates, ranging from fully open flow from the second conduit to the drain conduit to fully closed flow from the second conduit to the drain conduit; and
a controller operatively connected to control the feathering system in the feathering mode, wherein the controller includes machine readable instructions configured to cause the controller to:
receive input indicative of a need to feather the rotor pitch angle actuator, and command the feathering system to switch to the feathering mode;
command the feathering system to drain the second conduit to the drain conduit at the fully open flow initially;
receive input indicative of exiting the need to feather, and command the feathering system to modulate drainage from the second conduit to the drain conduit somewhere in the range between fully open flow and fully closing off flow from the second conduit to the drain conduit.

2. The system as recited in claim 1, wherein modulating drainage includes gradually reducing rate of oil drain from the second conduit to the drain conduit.

3. The system as recited in claim 2, wherein modulating drainage includes after gradually reducing rate of oil drain, fully closing off flow draining the rotor pitch angle actuator.

4. The system as recited in claim 2, wherein gradually reducing rate of oil drain is performed under active control.

5. The system as recited in claim 2, wherein gradually reducing rate of oil drain is performed under passive control.

6. The system as recited in claim 1, wherein the feathering system includes a selector valve in fluid communication with the first conduit, with the second conduit, and with the drain conduit to selectively place the second conduit in fluid communication with the first conduit or with the drain conduit.

7. The system as recited in claim 6, wherein the feathering system includes an actively controlled metering valve in the drain conduit, configured to open, moderate, and close flow through the drain conduit under active control in the feathering mode.

8. The system as recited in claim 7, wherein the feathering system includes a passively controlled metering valve in the drain conduit, configured to passively meter flow in through the drain conduit in the feathering mode.

9. The system as recited in claim 1, further including a pump in fluid communication to provide pressurized liquid to the main control valve.

* * * * *